United States Patent
Liu et al.

(10) Patent No.: US 10,062,307 B2
(45) Date of Patent: Aug. 28, 2018

(54) ANTI-COUNTERFEIT LABEL AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Xiaomin Liu, Xiamen (CN); Ting Zhou, Xiamen (CN); Poping Shen, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 244 days.

(21) Appl. No.: 14/980,512

(22) Filed: Dec. 28, 2015

(65) Prior Publication Data

US 2016/0240112 A1    Aug. 18, 2016

(30) Foreign Application Priority Data

Feb. 13, 2015 (CN) .......................... 2015 1 0079315

(51) Int. Cl.
*B42D 25/00* (2014.01)
*G09F 3/00* (2006.01)
*G09F 3/03* (2006.01)
*G09F 3/02* (2006.01)

(52) U.S. Cl.
CPC .......... *G09F 3/0288* (2013.01); *B42D 25/00* (2014.10); *G09F 3/0292* (2013.01); *G09F 3/0294* (2013.01); *G09F 3/03* (2013.01); *G09F 2003/0213* (2013.01)

(58) Field of Classification Search
CPC ...................... B42D 2035/24; G02F 1/133528
USPC .......................... 283/90; 359/487.01, 487.02
See application file for complete search history.

(56) References Cited

U.S. PATENT DOCUMENTS

| | | | | |
|---|---|---|---|---|
| 3,391,479 A | * | 7/1968 | Jordan | B42D 25/00 283/90 |
| 3,655,494 A | * | 4/1972 | Buzzell | B42D 25/00 283/90 |
| 5,101,296 A | * | 3/1992 | Bell | G02B 27/28 283/90 |

(Continued)

FOREIGN PATENT DOCUMENTS

JP   WO 2014167834 A1 * 10/2014 ........... B42D 25/364

*Primary Examiner* — Kyle R Grabowski
(74) *Attorney, Agent, or Firm* — Anova Law Group, PLLC

(57) ABSTRACT

An anti-counterfeit label includes an anti-counterfeit information layer and a first regionalized polarization film formed on the anti-counterfeit information layer. The first regionalized polarization film has at least two distinct polarization directions. The anti-counterfeit label further includes a second regionalized polarization film. The second regionalized polarization film is used to cover the first regionalized polarization film. The second regionalized polarization film is configured to be combined with the first regionalized polarization film to display the unique encrypted information in the anti-counterfeit information layer. Therefore, the identifiability of the anti-counterfeit label is improved and, in the meantime, the anti-counterfeit label becomes more secured.

11 Claims, 7 Drawing Sheets

(56) References Cited

U.S. PATENT DOCUMENTS

| | | | | |
|---|---|---|---|---|
| 5,284,364 | A * | 2/1994 | Jain | B42D 25/00 283/90 |
| 6,667,797 | B2 * | 12/2003 | Wang | B42D 25/29 283/90 |
| 6,734,936 | B1 * | 5/2004 | Schadt | G02F 1/13363 349/117 |
| 6,955,839 | B2 * | 10/2005 | Gocho | B42D 25/364 283/904 |
| 7,762,203 | B2 * | 7/2010 | Hoshino | D01D 5/12 112/439 |
| 2003/0035191 | A1 * | 2/2003 | Moia | B42D 25/29 283/90 |
| 2004/0252259 | A1 * | 12/2004 | Schadt | B42D 25/29 349/98 |
| 2006/0115082 | A1 * | 6/2006 | Kevenaar | B42D 25/29 380/216 |
| 2008/0106725 | A1 * | 5/2008 | Schuetzmann | B42D 25/29 356/71 |
| 2012/0007351 | A1 * | 1/2012 | Suzuki | B42D 25/29 283/85 |
| 2012/0328852 | A1 * | 12/2012 | Tiller | B42D 25/29 428/195.1 |
| 2016/0052327 | A1 * | 2/2016 | Ohkawa | B42D 25/391 356/71 |

* cited by examiner

ANTI-COUNTERFEIT LABEL AND FABRICATION METHOD THEREOF

CROSS-REFERENCES TO RELATED APPLICATIONS

This application claims the priority of Chinese patent application No. 201510079315.4, filed on Feb. 13, 2015, the entirety of which is incorporated herein by reference.

FIELD OF THE INVENTION

The present invention generally relates to the field of security technology and, more particularly, relates to an anti-counterfeit label and the fabricating process thereof.

BACKGROUND

An anti-counterfeit label, also known as anti-counterfeit logo or anti-counterfeit trademark, is a label that has an anti-counterfeiting function and can be pasted, printed, or transferred onto outside surfaces, packages, or accompaniments of goods. As an effective means to protect brand-name products and to distinguish brand products from counterfeit products, anti-counterfeit labels have been extensively used in various areas. There are many types of anti-counterfeit labels, including holographic anti-counterfeit labels, graphic-output laser anti-counterfeit labels, shape memory anti-counterfeit labels, etc.

To select an anti-counterfeit technology, it needs to be not only easy to be recognized but also difficult to be counterfeited, so that the selected anti-counterfeit technology can truly provide the desired protection. In current anti-counterfeit technology, a printing or stamping method is frequently used to fabricate anti-counterfeit labels of the traditional type. Because the traditional anti-counterfeit technology may be easily counterfeited, a more complicated anti-counterfeit logo has to be used. However, using a complicated logo increases the challenges in identifying the logo by consumers, impacting the anti-counterfeit effect. Therefore, new types of anti-counterfeit labels may be needed.

The disclosed anti-counterfeit label and fabricating process are directed to solve one or more problems set forth above and other problems.

BRIEF SUMMARY OF THE DISCLOSURE

One aspect of the present disclosure provides an anti-counterfeit label. The anti-counterfeit label includes an anti-counterfeit information layer and a first regionalized polarization film formed on the anti-counterfeit information layer. The first regionalized polarization film further includes at least two polarization directions. The anti-counterfeit label further includes a second regionalized polarization film. The second regionalized polarization film is used to cover the first regionalized polarization film. The second regionalized polarization film is configured to be combined with the first regionalized polarization film to display the encrypted information in the anti-counterfeit information layer.

Another aspect of the present disclosure provides a method for fabricating the anti-counterfeit label. The fabrication method includes: providing a carrier substrate; forming a flexible base on the carrier substrate; forming a first organic film on the flexible base; irradiating the patterned first organic film with polarized ultraviolet light to form a first regionalized polarizing layer; stripping off the carrier substrate to form a first regionalized polarization film. The first regionalized polarization film has at least two polarization directions. The fabrication method further includes providing an anti-counterfeit information layer and placing the first regionalized polarization film onto the anti-counterfeit information layer. The fabrication method also includes forming a second regionalized polarization film following a process similar to that for forming the first regionalized polarization film described above. The second regionalized polarization film is used to cover the first regionalized polarization film. The second regionalized polarization film is configured to be combined with the first regionalized polarization film to display the encrypted information in the anti-counterfeit information layer.

Accordingly, the anti-counterfeit label of the present disclosure comprises the anti-counterfeit information layer and the first regionalized polarization film. The anti-counterfeit information layer contains a mix of encrypted information and scrambling information. When the anti-counterfeit label is paired up with the second regionalized polarization film, the regions of the first regionalized polarization film with different polarization directions operate in coordination with the second regionalized polarization film so that the unique encrypted information in the anti-counterfeit label can be identified. Therefore, the identifiability of the anti-counterfeit label is improved and, in the meantime, the anti-counterfeit label becomes more secured.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
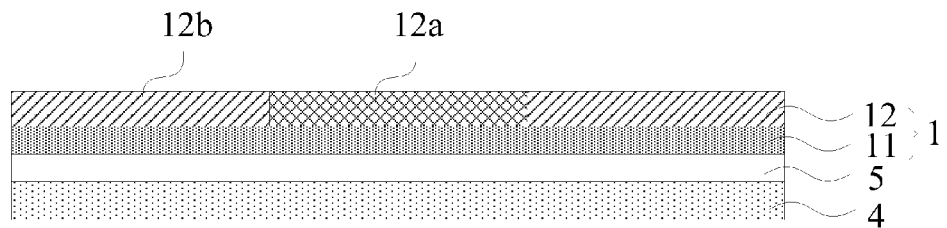
FIG. 1 illustrates a schematic cross-section view of an anti-counterfeit label consistent with disclosed embodiments.

FIG. 1 shows a schematic cross-section view of an anti-counterfeit label consistent with one embodiment of the present disclosure. Referring to FIG. 1, an anti-counterfeit label includes an anti-counterfeit information layer 4 and a first regionalized polarization film 1 arranged on the anti-counterfeit information layer 4. The anti-counterfeit label may also include a first adhesive layer 5 formed on the anti-counterfeit information layer 4. Other components may also be included.

The anti-counterfeit information layer 4 may include a mix of encrypted information and scrambling information. The encrypted information may include characters, color combinations, and patterns, etc. The first regionalized polarization film 1 has at least two polarization directions. The number of polarization directions that the first regionalized polarization film 1 has may be the same as the number of the types of information that the anti-counterfeit information layer 4 has.

The first adhesive layer 5 may be located between the anti-counterfeit information layer 4 and the first regionalized polarization film 1, and may be used to bond the first regionalized polarization film 1 to the anti-counterfeit information layer 4. The first adhesive layer 5 may be made of one or more of urea-formaldehyde glue, epoxy, polyacrylate glue, polyvinyl acetate emulsion, etc.

The first regionalized polarization film 1 may include a flexible base 11 and a regionalized polarizing layer 12 arranged on the flexible base 11. The regionalized polarizing layer 12 has at least two polarization directions, i.e., at least two regions each having a different polarization direction. In one embodiment, the regionalized polarizing layer 12 has two polarization directions. The two polarization directions are a first polarization direction 12a and a second polarization direction 12b, respectively.

The flexible base 11 may be made of flexible materials, such as polyimide and polydimethylsiloxane, to provide sufficient flexibility for the first regionalized polarization film 1. The regionalized polarizing layer 12 may include a polymer doped with a dichroic dye. The dichroic organic dye is a dye material having photo absorption properties along the long axis of the molecules different from photo absorption properties along the short axis and thus showing different colors when the molecules are oriented along different directions. The dichroic organic dye may include azo dye, anthraquinone dye, diphenyl dye, triphenyl dioxazine dye and its derivatives, single-methine and multiple-methine dye, poly ring dye, etc.

The dichroic dye may be doped into the polymer. The polymer may be a polyimide material with high temperature and high humidity capability. Under irradiation of polarized ultraviolet light, the imide groups in the polymer are excited, producing free radicals and leading to polymer degradation. The molecules with a direction of the chain parallel to the polarization direction of the polarized ultraviolet light are degraded; while molecules with a chain perpendicular to the polarization direction of the polarized ultraviolet light still have a large number of un-degraded imide groups. Governed by the van der Waals force, the molecule chains of the polymer are aligned along the direction perpendicular to the polarization direction of the polarized ultraviolet light. Therefore, the molecules of the dichroic dye doped into the polymer are also aligned in coordination with the alignment of the polyimide material. Because of the difference in the light transmission rate of the molecules of the dichroic organic dye along the long axis and along the short axis, a preset polarization direction in the regionalized polarizing layer 12 may be realized.

Figure 2:
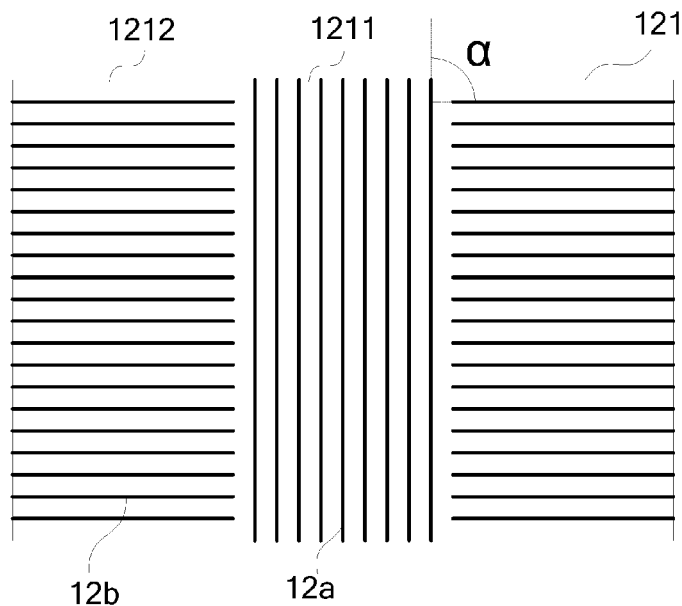
FIG. 2 illustrates a schematic diagram of the polarization directions of different regions in a first regionalized polarization film consistent with disclosed embodiments.

FIG. 2 shows a schematic diagram of the polarization directions of different regions in a first regionalized polarizing layer consistent with disclosed embodiments. Referring to FIG. 2, a regionalized polarizing layer 121 of the first regionalized polarization film 1 includes two distinct polarization directions. The two polarization directions are the first polarization direction 12a and the second polarization direction 12b, respectively. That is, the first regionalized polarization film 1 includes a first region 1211 polarized along the first polarization direction 12a and a second region 1212 polarized along the second polarization direction 12b. In one embodiment, the first polarization direction 12a is substantially perpendicular to the second polarization direction 12b, that is, the angle α between neighboring polarization directions 12a and 12b in the first regionalized polarization film 1 is approximately 90°.

Figure 3:
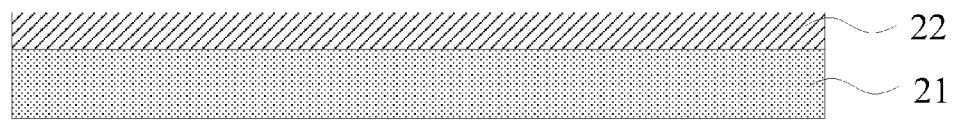
FIG. 3 illustrates a schematic cross-section view of a second regionalized polarization film consistent with disclosed embodiments.

FIG. 3 shows a schematic cross-section view of a second regionalized polarization film consistent with disclosed embodiments. Referring to FIG. 3, the second polarization film 2 includes a flexible base 21 and a regionalized polarizing layer 22 arranged on the top of the flexible base 21. The regionalized polarizing layer 22 has at least one polarization direction. In one embodiment, the regionalized polarizing layer 22 has one polarization direction.

Figure 4:
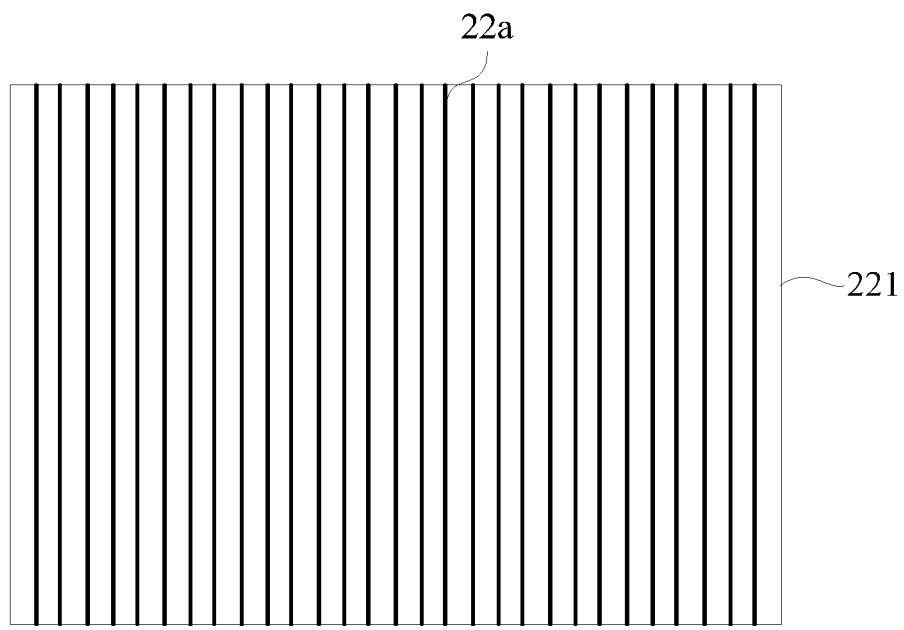
FIG. 4 illustrates a schematic diagram of the polarization direction of a second regionalized polarization film consistent with disclosed embodiments.

FIG. 4 shows a schematic diagram of the polarization direction of a second regionalized polarization film consistent with disclosed embodiments. Referring to FIG. 4, the second regionalized polarization film 2 includes a regionalized polarizing layer 221. The regionalized polarizing layer 221 is polarized along a sixth polarization direction 22a. The sixth polarization direction 22a is the same as the first polarizing direction 12a of the first polarization film 1. Therefore, when the second regionalized polarization film 2 in the disclosed embodiment is used together with the first regionalized polarization film 1, because the sixth polarization direction 22a of the second regionalized polarization film 2 is the same as the first polarization direction 12a of the first regionalized polarization film 1, light beams parallel to the first polarization direction 12a of the first regionalized polarization film 1 are transmitted so that the encrypted information in the anti-counterfeit information layer 4 corresponding to the first region 1211 of the first regionalized polarization film 1 may be displayed.

In the meantime, because the second polarization direction 12b of the first regionalized polarization film 1 is perpendicular to the sixth polarization direction 22a of the second regionalized polarization film 2, light beams in the second region 1212 of the first regionalized polarization film 1 may be blocked, thus the scrambling information in the anti-counterfeit information layer corresponding to the second region 1212 may not be displayed. In certain embodiments, the encrypted information may be stored in the anti-counterfeit information layer corresponding to the first region 1211, and the scrambling information may be stored in the anti-counterfeit information layer corresponding to the second region 1212.

In one embodiment, a first regionalized polarization film may have more than two distinct polarization directions. When a polarization direction of a second regionalized polarization film 2 is the same as one of the polarization directions of the first regionalized polarization film 1, encrypted information in an anti-counterfeit information layer 4 corresponding to regions of the first regionalized polarization film 1 that have the same polarization direction as the second regionalized polarization film 2 can be displayed. In the meantime, an angle α between any two neighboring polarization directions in the first regionalized polarization film 1 may satisfy α=180°/n where n is the total number of the polarization directions in the first regionalized polarization film 1.

In other embodiments, a first regionalized polarization film may have at least two distinct polarization directions. A second regionalized polarization film 2, with preset polarization directions corresponding to the polarization directions of the first polarization film 1, may be used together with the first regionalized polarization film 1 to display different patterns. Further, an angle α between any two neighboring polarization directions in the first regionalized polarization film 1 may satisfy α>1°. That is, the first polarization direction 12a and the second polarization direction 12b may form any angle greater than 1°.

Accordingly, the anti-counterfeit label may be formed by an anti-counterfeit information layer and a first regionalized polarization film. The anti-counterfeit information layer contains a mix of encrypted information and scrambling information. When the anti-counterfeit label is paired up with the second regionalized polarization film, the regions of the first regionalized polarization film with different polarization directions cooperate with the second regionalized polarization film so that the unique encrypted information in the anti-counterfeit label can be identified. Therefore, the identifiability of the anti-counterfeit label is improved and, in the meantime, the anti-counterfeit label becomes more secured.

Figure 5:
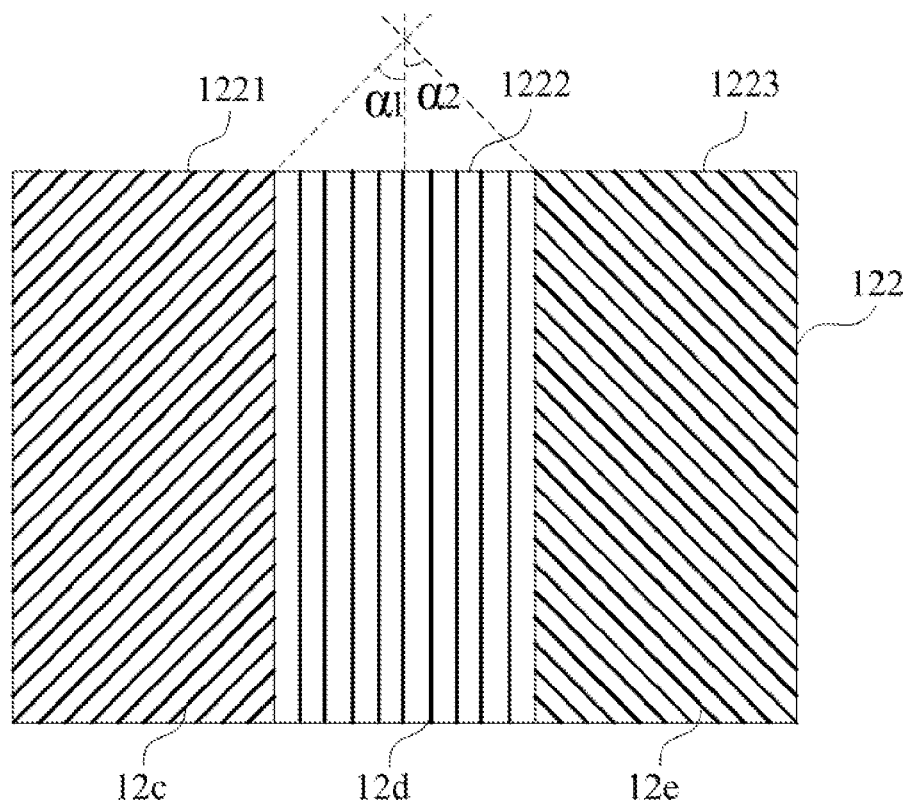
FIG. 5 illustrates a schematic diagram of the polarization directions of different regions in a first regionalized polarization film consistent with disclosed embodiments.

FIG. 5 shows a schematic diagram of the polarization directions of different regions in a first regionalized polarization film consistent with disclosed embodiments. Referring to FIG. 5, a regionalized polarizing layer 122 of the first regionalized polarization film has three different polarization directions: a third polarization direction 12c, a fourth polarization direction 12d, and a fifth polarization direction 12e. That is, the first regionalized polarization film 1 includes a third region 1221 polarized along the third polarization direction 12c, a fourth region 1222 polarized along the fourth polarization direction 12d, and a fifth region 1223 polarized along the fifth polarization directions 12e. In the present embodiment, the angle between each neighboring pair of the third polarization direction 12c, the fourth polarization direction 12d, and the fifth polarization direction 12e is 120°. That is, the angle α1 between the third polarizing direction 12c and the fourth polarizing direction 12d is 60°; while the angle α2 between the fourth polarizing direction 12d and the fifth polarizing direction 12e is also 60°.

Figure 6:
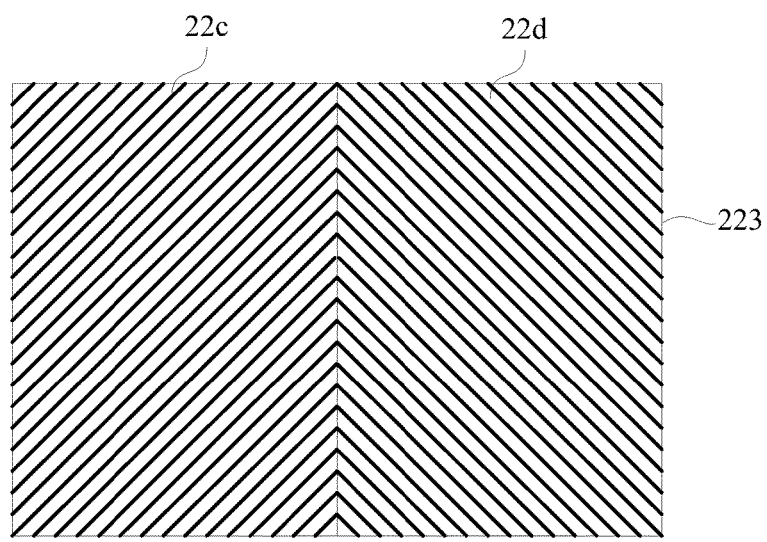
FIG. 6 illustrates a schematic diagram of the polarization directions of different regions in a second regionalized polarization film consistent with disclosed embodiments.

FIG. 6 shows a schematic diagram of the polarization directions of different regions in a second regionalized polarization film consistent with disclosed embodiments. Referring to FIG. 6, the second regionalized polarization film 2 includes a flexible base and a regionalized polarizing layer 223 arranged on the top of the flexible base.

The regionalized polarizing layer 223 has two polarization directions and the two polarization directions are a seventh polarization direction 22c and an eighth polarization direction 22d, respectively. The seventh polarization direction 22c of the second regionalized polarization film 2 is the same as the third polarization direction 12c of the first regionalized polarization film 1 while the eighth polarization direction 22d of the second regionalized polarization film 2 is the same as the fifth polarization direction 12e of the first regionalized polarization film 1.

Therefore, when the second regionalized polarization film 2 is used in coordination with the first regionalized polarization film 1, the region in the second regionalized polarization film 2 polarized along the seventh polarization direction 22c cooperates with the third region 1221 of the first regionalized polarization film 1, thus light beams parallel to the third polarization direction 12c of the first regionalized polarization film 1 are transmitted so that encrypted information in the anti-counterfeit information layer 4 corresponding to the third region 1221 of the first regionalized polarization film 1 may be displayed.

Similarly, the region in the second regionalized polarization film 2 polarized along the eighth polarization direction 22d cooperates with the fifth region 1223 of the first regionalized polarization film 1, thus light beams parallel to the fifth polarization direction 12e of the first regionalized polarization film 1 are transmitted so that encrypted information in the anti-counterfeit information layer corresponding to the fifth region 1223 of the first regionalized polarization film 1 may be displayed. However, there is always a certain angle between the fourth polarization direction of the first regionalized polarization film 1 and the seventh polarization direction 22c of the second regionalized polarization film 2 or between the fourth polarization direction of the first regionalized polarization film 1 and the eighth polarization direction 22e of the second regionalized polarization film 2. Thus, the fourth region 1222 of the first regionalized polarization film 1 may block the transmission of light beams so that the scrambling information in the anti-counterfeit information layer corresponding to the fourth region 1222 may not be displayed.

In one embodiment, the flexible base in the first regionalized polarization film 1 may also be made of materials such as polyimide and polydimethylsiloxane to provide sufficient flexibility for the first regionalized polarization film 1. The regionalized polarizing layer includes a polymer doped with a dichroic dye. The dichroic organic dye may be azo dye, anthraquinone dye, diphenyl dye, triphenyl dioxazine dye and its derivatives, single-methine and multiple-methine dye, poly ring dye, etc.

In one embodiment, a first regionalized polarization film 1 may have more than three distinct polarization directions, a second regionalized polarization film 2 with preset polarization directions corresponding to the polarization directions of the first regionalized polarization film 1 may be used to display unique encrypted information in an anti-counterfeit information layer 4. In the meantime, an angle α between any two neighboring polarization directions in the first regionalized polarization film 1 may satisfy α=180°/n, where n is the total number of the polarization directions in the first regionalized polarization film 1.

In certain other embodiments, a first regionalized polarization film 1 may have at least two distinct polarization directions. A second regionalized polarization film 2, with preset polarization directions corresponding to the polarization directions of the first polarization film 1, may be used together with the first regionalized polarization film 1 to The first regionalized polarization film may cooperate with a second regionalized polarization film that has a preset polarization direction to display different patterns. That is, an angle α between neighboring polarization directions in the first regionalized polarization film 1 may satisfy α>1°. That is, the third polarization direction 12c, the fourth polarization direction 12d, and the fifth polarization direction 12e may form any angle greater than 1°.

In one embodiment, the anti-counterfeit label may be formed by an anti-counterfeit information layer and a first regionalized polarization film. The anti-counterfeit information layer contains a mix of encrypted information and scrambling information. When the anti-counterfeit label is paired up with the second regionalized polarization film, the regions of the first regionalized polarization film with different polarization directions operate in coordination with the second regionalized polarization film so that the unique encrypted information in the anti-counterfeit label can be identified. Therefore, the identifiability of the anti-counterfeit label is improved and, in the meantime, the anti-counterfeit label becomes more secured.

Figure 7:
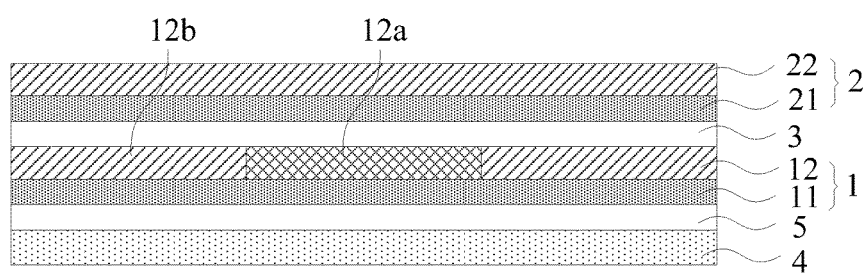
FIG. 7 illustrates a schematic cross-section view of an exemplary structure of an anti-counterfeit label combined with a second regionalized polarization film consistent with disclosed embodiments.

FIG. 7 shows a schematic cross-section view of an exemplary structure of an anti-counterfeit label combined with a second regionalized polarization film consistent with disclosed embodiments. Referring to FIG. 7, an anti-counterfeit label includes an anti-counterfeit information layer 4 and a first regionalized polarization film 1 arranged on the anti-counterfeit information layer 4. The anti-counterfeit information layer 4 includes a mix of encrypted information and scrambling information. The first regionalized polarization film 1 has at least two polarization directions. A first adhesive layer 5, located between the anti-counterfeit information layer 4 and the first regionalized polarization film 1, may be used to bond the first regionalized polarization film 1 to the anti-counterfeit information layer 4. A second regionalized polarization film 2 covers the first regionalized polarization film 1 to display the encrypted information in the anti-counterfeit information layer 4.

A second adhesive layer 3 may be arranged between the first regionalized polarization film 1 and the second regionalized polarization film 2 to ensure the accuracy and stability of the alignment between the first regionalized polarization film 1 and the second regionalized polarization film 2. The adhesive coefficient of the selected second adhesive layer 3 may be less than the adhesive coefficient of the first adhesive layer 5 in order to let the second regionalized polarization film 2 can be easily peeled off. The peeling strength of the first adhesive layer 5 may be >80 g/cm while the peeling strength of the second adhesive layer 3 may be greater than or equal to 20 g/cm but smaller than or equal to 50 g/cm. As such, when peeling off the second regionalized polarization film 2, the first regionalized polarization film 1 may remain attached on the anti-counterfeit information layer 4, thus only the second regionalized polarization film 2 comes off.

The first regionalized polarization film 1 includes a flexible base 11 and a regionalized polarizing layer 12 arranged on the flexible base 11. The regionalized polarizing layer 12 has at least two polarization directions, e.g., 2, 3, 4, 5, or more. In one embodiment, the regionalized polarizing layer 12 has two polarization directions. The two polarization directions are a first polarization direction 12a and a second polarization direction 12b, respectively. The flexible base may be made of flexible materials such as polyimide and polydimethylsiloxane to provide sufficient flexibility for the first regionalized polarization film 1. The regionalized polarizing layer 12 includes a polymer doped with a dichroic dye. The dichroic organic dye is a dye material having different photo absorption properties and coordinately showing different colors along the long axis and the short axis of the molecule of the organic dye. The dichroic organic dye may include azo dye, anthraquinone dye, diphenyl dye, triphenyl dioxazine dye and its derivatives, single-methine and multi-methine dye, and/or poly ring dye.

Figure 8:
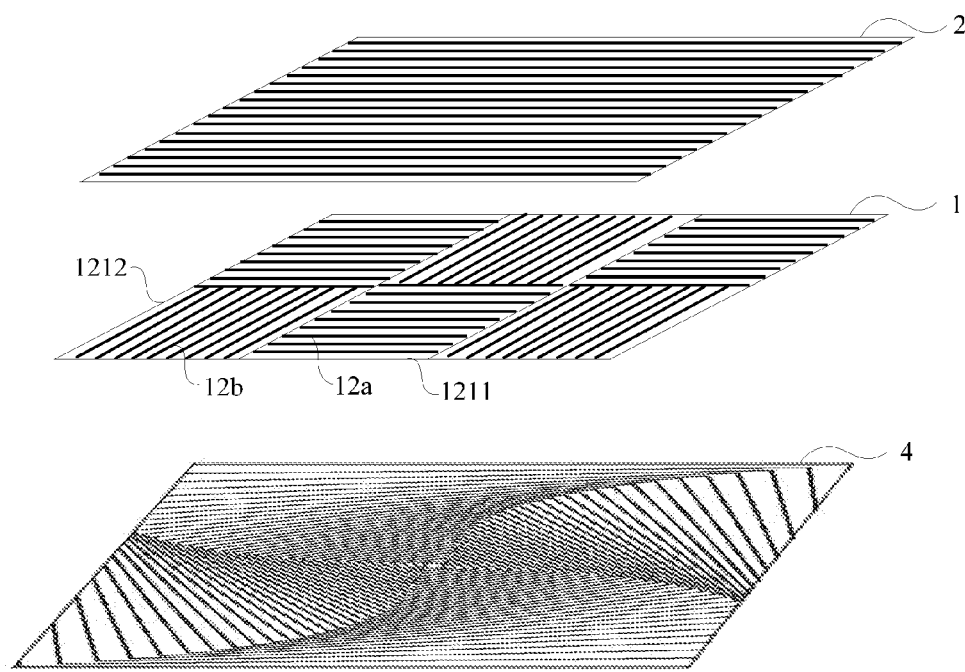
FIG. 8 illustrates a schematic diagram of the polarization directions in the anti-counterfeit label and the second regionalized polarization film shown in FIG. 7.

FIG. 8 shows a schematic structural diagram of the polarization directions in the anti-counterfeit label and the second regionalized polarization film shown in FIG. 7. Referring to FIG. 8, the first regionalized polarization film 1 of the anti-counterfeit label includes two distinct polarization directions. The two polarization directions are the first polarization direction 12a and the second polarization direction 12b, respectively. That is, the first regionalized polarization film 1 includes a first region 1211 polarized along the first polarization direction 12a and a second region 1212 polarized along the second polarization direction 12b.

In one embodiment, the first polarization direction 12a is substantially perpendicular to the second polarization direction 12b. That is, the angle α between neighboring polarization directions 12a and 12b in the first regionalized polarization film 1 equals to 90°. The first regionalized polarization film 1 may include a plurality of the first regions 1211 and a plurality of the second regions 1212 arranged in any means. The encrypted information is stored in the anti-counterfeit information layer 4 corresponds to the plurality of the first regions 1211 of the first regionalized polarization film 1. The scrambling information is stored in the anti-counterfeit information layer 4 corresponds to the plurality of the second regions 1212 of the first regionalized polarization film 1.

Figure 9:
FIG. 9 illustrates a schematic diagram of exemplary encrypted information displayed by combining an anti-counterfeit label with a second regionalized polarization film into a configuration as schematically shown in FIG. 8.

When a second regionalized polarization film 2 is paired up with the anti-counterfeit label, because the polarization direction of the second regionalized polarization film 2 is the same as the polarization direction of the plurality of the first regions 1211 of the first regionalized polarization film 1, the encrypted information in the anti-counterfeit information layer 4 corresponding to the plurality of the first regions 1211 of the first regionalized polarization film 1 may then be displayed. FIG. 9 shows a schematic diagram of exemplary encrypted information displayed by combining an anti-counterfeit label with a second regionalized polarization film into a configuration as schematically shown in FIG. 8.

Referring to FIG. 9, the content displayed, "TianMa", is the encrypted information 41 in the anti-counterfeit information layer 4. The displayed encrypted information in the anti-counterfeit information layer 4 corresponds to the plurality of the first regions 1211 of the first regionalized polarization film. However, because there is a certain angle between the second polarization direction 12b of the first regionalized polarization film 1 and the polarization direction of the second regionalized polarization film 2, the scrambling information in the anti-counterfeit information layer 4 corresponding to the plurality of the second regions 1212 polarized along the second polarization direction 12b may not be displayed.

In certain other embodiments, the displayed encrypted information in the anti-counterfeit information layer may be characters, color combinations, or patterns. In addition, the encrypted information and the scrambling information combined or overlapped in the anti-counterfeit information layer may have pre-defined polarization directions, thus when the anti-counterfeit information layer is used together with the first regionalized polarization film and the second regionalized polarization film, the encrypted information and the scrambling information may be separated, and the identifiability of the anti-counterfeit label may be further improved.

Further, encrypted information stored in the anti-counterfeit information layer may correspond to more than one polarization directions of the first regionalized polarization film. That is, the first regionalized polarization film has more than two polarization directions with at least two polarization directions corresponding to the encrypted information. A second regionalized polarization film may be configured to have the same polarization directions as the first regionalized polarization film in areas corresponding to the encrypted information in the anti-counterfeit information layer while have a polarization direction different from the polarization of the first regionalized polarization film in areas corresponding to the scrambling information in the anti-counterfeit information layer. As such, using the second regionalized polarization film to cover the first regionalized polarization film, the unique encrypted information may be displayed.

Figure 10:
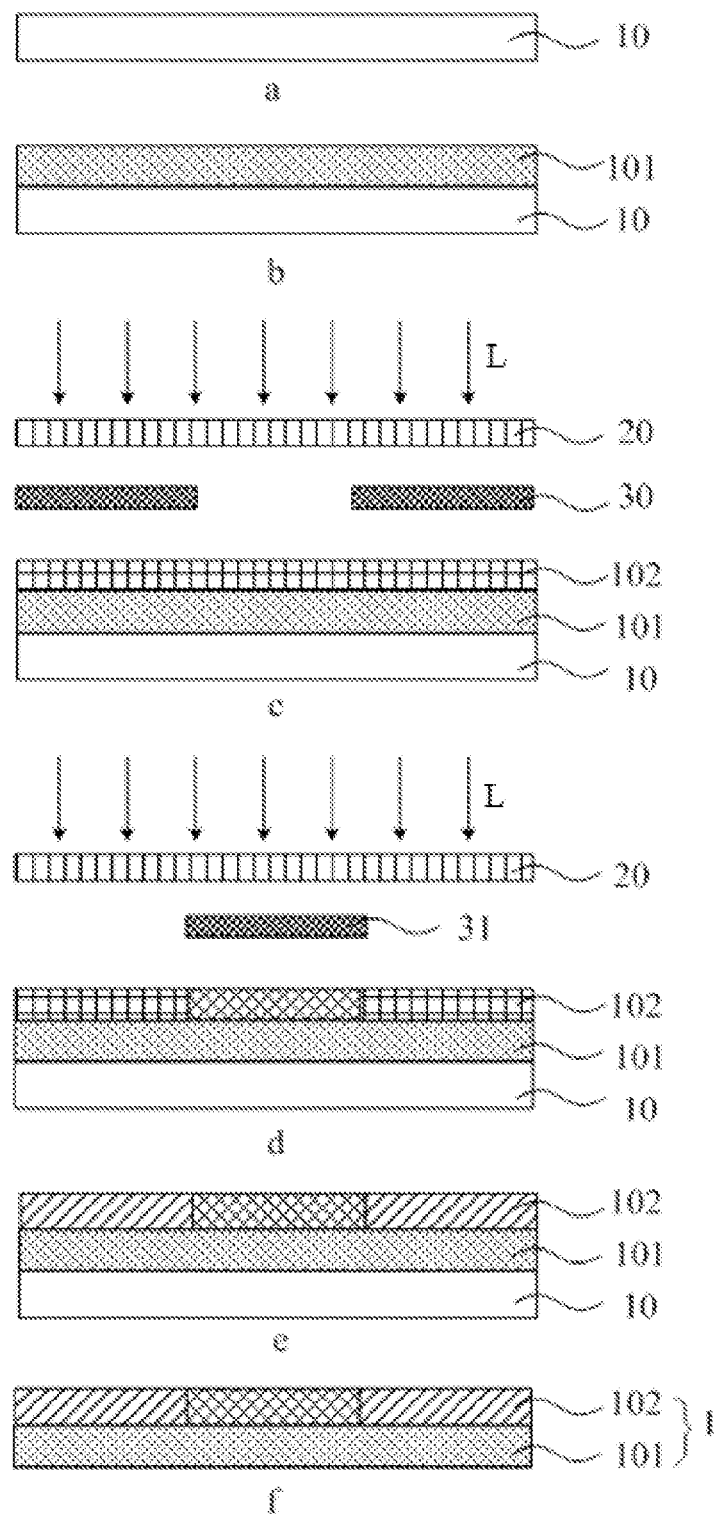
FIG. 10 illustrates a set of schematic diagrams of a method for fabricating a first regionalized polarization film consistent with disclosed embodiments.
Figure 11:
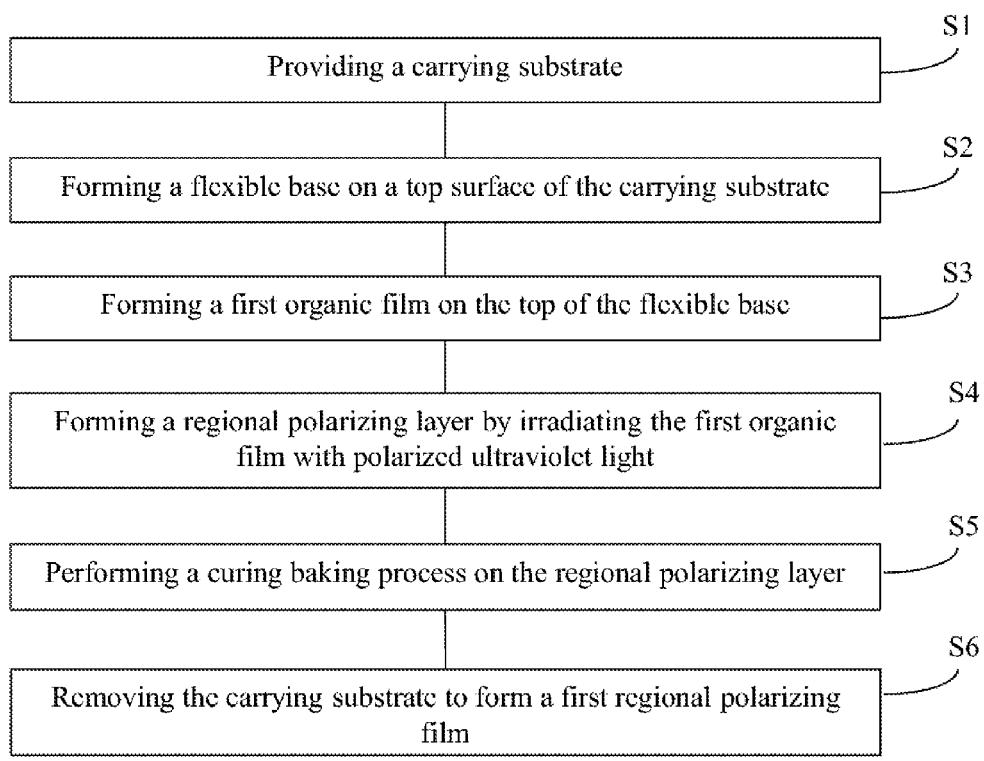
FIG. 11 illustrates a flowchart for fabricating a first regionalized polarization film consistent with disclosed embodiments.

FIG. 10 shows a set of schematic diagrams of a method for fabricating a first regionalized polarization film consistent with disclosed embodiments. FIG. 11 shows a flowchart of the fabrication process for the first regionalized polarization film.

At the beginning of the fabrication, a carrier substrate 10 is provided (S1). FIG. 10a shows such a carrier substrate. The carrier substrate 10 may be a glass substrate or a resin substrate.

Further, a flexible base 101 may be formed on a top surface of the carrier substrate 10 (S2). FIG. 10b shows a corresponding structure after the formation of the flexible base 101.

The flexible base 101 may be formed through the following process: a polyimide solution may be coated on the carrier substrate 10; then, a prebaking process may be performed to form a polyimide layer; further, a polarized ultraviolet source may be used to irradiate the polyimide layer so that the polyimide may be aligned; finally, a curing backing process may be performed to form the flexible base 101. The prebaking temperature may be in a range of 90°~130° and the prebaking time may be in a range of 90 s~120 s. The intensity of the ultraviolet light may be in a range of 1000 mJ~3000 mJ. The curing baking temperature may be in a range of 210°~230° and the curing baking time may be in a range of 20 min~50 min. Besides polyimide material, the flexible base 101 may also be made of polydimethylsiloxane material or other appropriate materials.

Further, returning to FIG. 11, a first organic film 102 may be coated on the top of the flexible base 101 (S3). As shown in FIG. 10c, the first organic film 102 is made of polymer and doped with a dichroic dye. The dichroic dye may be one or more of azo dye, anthraquinone dye, diphenyl dye, triphenyl dioxazine dye and its derivatives, single-methine and multiple-methine dye, poly ring dye, etc. The polymer may be a polyimide material. After the first organic film 102 is coated, a prebaking process may be performed. The prebaking temperature may be in a range of 90°~130° and the prebaking time may be in a range of 90 s~120 s.

Further, returning to FIG. 11, a regionalized polarizing layer 102 may be formed by irradiating the first organic film 102 with polarized ultraviolet light (S4). FIGS. 10c and 10d illustrate the fabrication of the regionalized polarizing layer 102 with different polarization directions for different regions.

Referring to FIG. 10c, a polarizer 20 is provided. The polarizer 20 may be a metal grating with a preset polarization direction. Polarized ultraviolet light is generated after ultraviolet light L passing through the polarizer 20. The intensity of the ultraviolet light may be in a range of 800 mJ~1000 mJ. The first organic film 102 is patterned by irradiating the first organic film 102 with the polarized ultraviolet light through a first mask plate 30, therefore the portion of the first organic film 102 not shielded by the first mask plate 30 is polarized along a first polarization direction.

Referring to FIG. 10d, the carrier substrate is then rotated. The first organic film 102 is patterned by irradiating the first organic film 102 with the polarized ultraviolet light through a second mask plate 31, therefore the portion of the first organic film 102 not shielded by the second mask plate 31 is polarized along a second polarization direction.

In one embodiment, the shielding areas of the first mask plate 30 and the second mask plate 31 are complementary with each other. That is, the shielding areas of the first mask plate 30 correspond to the exposing areas of the second mask plate 31, and the shielding areas of the second mask plate 31 correspond to the exposing areas of the first mask plate 30. In certain other embodiments, more than two mask plates with the shielding areas complementary with each other may be used. In addition, the mask plates may be designed corresponding to the polarization directions of different regions in the first regionalized polarization film 1.

In one embodiment, the first regionalized polarization film 1 includes a number of first regions 1211 polarized along the first polarization direction and a number of second regions 1212 polarized along the second polarization direction. The angle between the first polarization direction and the second polarization direction is 90°.

Further, returning to FIG. 11, a curing baking process may be performed (S5). FIG. 10e shows a schematic cross-section view of the structure after the curing baking process. The curing baking temperature may be in a range of 210°~230° and the curing baking time may be in a range of 20 min~50 min.

Returning to FIG. 11, finally, the carrier substrate 10 may be removed (S6). FIG. 10f shows a schematic cross-section view of the structure after removing the carrier substrate 10.

Specifically, the edge of the carrier substrate may be cut off by using laser cutting or a rotary blade. Then, rinsing the structure with warm water, the flexible base 101 and the carrier substrate 10 can be separated and the first regionalized polarization film 1 may be formed.

In certain other embodiments, the first regionalized polarization film may have more than two polarization directions, correspondingly, the irradiation process needs to be repeated to define all the polarization directions. For example, a first regionalized polarization film 1 includes a third region, a fourth region, and a fifth region. The first organic film may be irradiated with polarized light through a third mask plate so that the third region is polarized along a third polarization direction; the first organic film is then irradiated with polarized light through a fourth mask plate so that the fourth region is polarized along a fourth polarization direction; finally, the first organic film is irradiated with polarized light through a fifth mask plate so that the fifth region is polarized along a fifth polarization direction. An angle of 120° is formed between any pair of the third polarization direction, the fourth polarization direction, and the fifth polarization direction.

Further, the second regionalized polarization film may be fabricated through a similar process as the first regionalized polarization film described above. Specifically, the fabrication of the second regionalized polarization film includes the following steps:

First, a carrier substrate is provided and the carrier substrate may be a glass substrate of a resin substrate.

Further, a flexible base may be formed on a top surface of the carrier substrate. The flexible base may be formed through the following process: a polyimide solution may be coated on the carrier substrate; then, a prebaking process may be performed to form a polyimide layer; further, a polarized ultraviolet source may be used to irradiate the polyimide layer so that the polyimide is aligned; finally, a curing backing process may be performed to form the flexible base. The prebaking temperature may be in a range of 90°~130° and the prebaking time may be in a range of 90 s~120 s. The intensity of the ultraviolet light may be in a range of 1000 mJ~3000 mJ. The curing baking temperature may be in a range of 210°~230° and the curing baking time may be in a range of 20 min~50 min. Besides polyimide material, the flexible base may also be made of polydimethylsiloxane material.

Then, a second organic film may be coated on the top of the flexible base. The second organic film is made of polymer and doped with a dichroic dye. The dichroic dye is one or more of azo dye, anthraquinone dye, diphenyl dye, triphenyl dioxazine dye and its derivatives, single-methine and multiple-methine dye, poly ring dye, etc. The polymer may be a polyimide material. After the second organic film is coated, a prebaking process may be performed. The prebaking temperature may be in a range of 90°~130° and the prebaking time may be in a range of 90 s~120 s.

Further, a regionalized polarizing layer may be formed by using polarized ultraviolet light to irradiate the second organic film. At the beginning of the irradiation process, a polarizer is provided. The polarizer may be a metal grating with a preset polarization direction. Polarized ultraviolet light may be generated after ultraviolet light L passing through the polarizer. The intensity of the ultraviolet light may be in a range of 800 mJ~1000 mJ. The second organic film may be patterned by irradiating the film with the polarized ultraviolet light through a sixth mask plate, therefore the portion of the second organic film not shielded by the sixth mask plate is polarized along a sixth polarization direction. The polarization direction of the second regionalized polarization film is the same as one of the polarization directions of the first regionalized polarization film. In one embodiment, the sixth polarization direction of the second regionalized polarization film is the same as the first polarization direction of the first regionalized polarization film.

Further, a curing baking process may be performed. The curing baking temperature may be in a range of 210°~230° and the curing baking time may be in a range of 20 min~50 min.

Finally, the carrier substrate may be stripped off. Specifically, the edge of the carrier substrate may be cut off by using laser cutting or a rotary blade. Then, rinsing the structure with warm water, the flexible base and the carrier substrate are separated and the second regionalized polarization film is formed.

Figure 12:
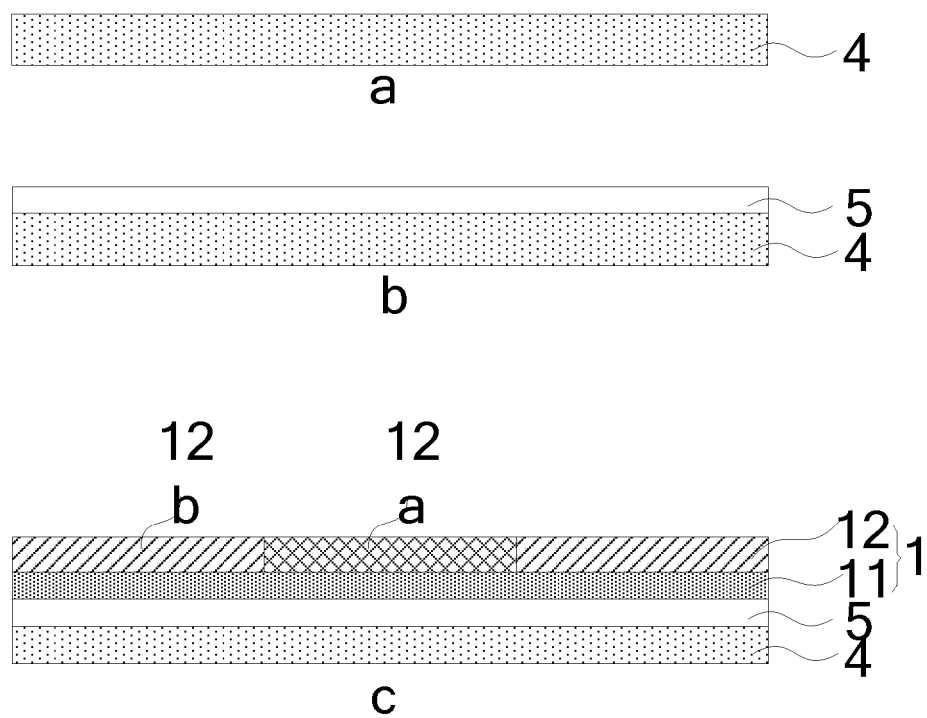
FIG. 12 illustrates a set of schematic diagrams of the method for fabricating an anti-counterfeit label consistent with the disclosed embodiments.

FIG. 12 shows a set of schematic diagrams of the method for fabricating an anti-counterfeit label consistent with disclosed embodiments.

Referring to FIG. 12a, at the beginning of the fabrication process, an anti-counterfeit information layer 4 is provided. The anti-counterfeit information layer 4 contains a mix of encrypted information and scrambling information. The encrypted information may be character, color combination, pattern, etc.

Further, a first adhesive layer 5 may be formed to cover the anti-counterfeit information layer 4. FIG. 12b shows a structure with the first adhesive layer 5 covering the anti-counterfeit information layer 4.

A first regionalized polarization film 1 may then be formed on the first adhesive layer 5. FIG. 12c shows a schematic cross-section view of the structure after the first regionalized polarization film 1 is formed. The first regionalized polarization film 1 includes a flexible base 11 and a regionalized polarizing layer 12 formed on the top of the flexible base 11. The regionalized polarizing layer 12 may have at least two distinct polarization directions. In one embodiment, the regionalized polarizing layer 12 has two polarization directions. The two polarization directions are a first polarization direction 12a and a second polarization direction 12b, respectively.

The anti-counterfeit label may be paired up with a second regionalized polarization film, and the second regionalized polarization film may or may not be considered as a part of the anti-counterfeit label. The polarization direction of the second regionalized polarization film is the same as one of the polarization directions of the first regionalized polarization film, thus the second regionalized polarization film may be used to cover the first regionalized polarization film to display the encrypted information.

In the present embodiment, the anti-counterfeit label is formed by an anti-counterfeit information layer and a first regionalized polarization film. The anti-counterfeit information layer contains a mix of encrypted information and scrambling information. When the anti-counterfeit label is paired up with the second regionalized polarization film, the regions of the first regionalized polarization film with different polarization directions operate in coordination with the second regionalized polarization film so that the unique encrypted information in the anti-counterfeit label can be identified. Therefore, the identifiability of the anti-counterfeit label is improved and, in the meantime, the anti-counterfeit label becomes more secured.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. An anti-counterfeit label for distinguishing a brand product from counterfeit products, comprising:
    an anti-counterfeit information layer containing unique encrypted information for distinguishing the brand product from the counterfeit products and scrambling information, wherein the encrypted information includes characters, color combinations, or patterns printed on the anti-counterfeit information layer for distinguishing the brand product from the counterfeit products;
    a first regionalized polarization film disposed on the anti-counterfeit information layer;
    a second polarization film;

a first adhesive layer arranged between the anti-counterfeit information layer and the first regionalized polarization film; and a second adhesive layer arranged between the first regionalized polarization film and the second polarization film, wherein:

the first regionalized polarization film has a first polarization direction and at least a second polarization direction different from the first polarization direction;

the encrypted information is stored in a first region of the anti-counterfeit information layer, the first region of the anti-counterfeit information layer is corresponding to at least a first region of the first regionalized polarization film, and the first region of the first regionalized polarization film has a polarization direction along the first polarization direction;

the scrambling information is stored in a second region of the anti-counterfeit information layer, the second region of the anti-counterfeit information layer is corresponding to at least a second region of the first regionalized polarization film, and the second region of the first regionalized polarization film has a polarization direction along the second polarization direction;

the second polarization film has a polarization direction along the first polarization direction, such that when the second polarization film is disposed to cover the first regionalized polarization film, the scrambling information is blocked and the unique encrypted information is displayed to distinguish the brand product from the counterfeit products, when the second polarization film is not disposed to cover the first regionalized polarization film, both the scrambling information and the unique encrypted information is displayed; and an adhesive coefficient of the second adhesive layer is less than an adhesive coefficient of the first adhesive layer.

2. The anti-counterfeit label according to claim 1, wherein the first regionalized polarization film includes a flexible base and a regionalized polarizing layer formed on the flexible base.

3. The anti-counterfeit label according to claim 2, wherein the regionalized polarizing layer includes a polymer doped with a dichroic dye.

4. The anti-counterfeit label according to claim 3, wherein:

the polymer includes a polyimide material; and the dichroic dye is one or more of azo dye, anthraquinone dye, diphenyl dye, triphenyl dioxazine dye and its derivatives, single-methine and multiple-methine dye, and poly ring dye.

5. The anti-counterfeit label according to claim 2, wherein the flexible base is made of polyimide or polydimethylsiloxane.

6. The anti-counterfeit label according to claim 1, wherein an angle between any two neighboring polarization directions of the first regionalized polarization film equals to 180°/n, where n is a total number of the polarization directions in the first regionalized polarization film.

7. The anti-counterfeit label according to claim 6, wherein:

the first regionalized polarization film only has the first polarization direction and the second polarization direction; and an angle between the first polarization direction and the second polarization direction is 90°.

8. The anti-counterfeit label according to claim 1, wherein an angle between any two neighboring polarization directions of the first regionalized polarization film is greater than 1°.

9. An anti-counterfeit label for distinguishing a brand product from counterfeit products, comprising:

an anti-counterfeit information layer containing unique encrypted information for distinguishing the brand product from the counterfeit products and scrambling information, wherein the encrypted information includes characters, color combinations, or patterns printed on the anti-counterfeit information layer for distinguishing the brand product from the counterfeit products;

a first regionalized polarization film disposed on the anti-counterfeit information layer;

a second regionalized polarization film;

a first adhesive layer arranged between the anti-counterfeit information layer and the first regionalized polarization film; and a second adhesive layer arranged between the first regionalized polarization film and the second regionalized polarization film, wherein:

the first regionalized polarization film has a first polarization direction, a second polarization, and a third polarization;

an angle between any two neighboring polarization directions of the first polarization direction, the second polarization direction, and the third polarization direction is 120°;

the encrypted information is stored in a first region and/or a third region of the anti-counterfeit information layer, the first region of the anti-counterfeit information layer is corresponding to a first region of the first regionalized polarization film with a polarization direction along the first polarization direction , and the third region of the anti-counterfeit information layer is corresponding to a third region of the first regionalized polarization film with a polarization direction along the third polarization direction;

the scrambling information is stored in a second region of the anti-counterfeit information layer, the second region of the anti-counterfeit information layer is corresponding to a second region of the first regionalized polarization film with a polarization direction along the second polarization direction;

the second regionalized polarization film includes a first region having a same polarization direction as the first region or the third region of the first regionalized polarization film, and a second region having a polarization direction different from the second region of the first regionalized polarization film, such that when the second polarization film is disposed to cover the first regionalized polarization film, the scrambling information is blocked and the unique encrypted information is displayed to distinguish the brand product from the counterfeit products, when the second polarization film is not disposed to cover the first regionalized polarization film, both the scrambling information and the unique encrypted information is displayed; and an adhesive coefficient of the second adhesive layer is less than an adhesive coefficient of the first adhesive layer.

10. The anti-counterfeit label according to claim 9, wherein the first adhesive layer is one or more of urea-formaldehyde glue, epoxy, polyacrylate glue, and polyvinyl acetate emulsion.

11. An anti-counterfeit label for distinguishing a brand product from counterfeit products, comprising:
- an anti-counterfeit information layer containing encrypted information for identifying the product and scrambling information not for identifying the product;
- a first regionalized polarization film disposed on the anti-counterfeit information layer;
- a second regionalized polarization film;
- a first adhesive layer arranged between the anti-counterfeit information layer and the first regionalized polarization film; and
- a second adhesive layer arranged between the first regionalized polarization film and the second regionalized polarization film, wherein:
- the first regionalized polarization film has a first polarization direction, at least a second polarization direction different from the first polarization direction, and a third polarization different from both the first polarization direction and second polarization direction;
- the encrypted information is stored in a first region of the anti-counterfeit information layer, the first region of the anti-counterfeit information layer is corresponding to at least a first region of the first regionalized polarization film, and the first region of the first regionalized polarization film has a polarization direction along the first polarization direction;
- the scrambling information is stored in a second region of the anti-counterfeit information layer, the second region of the anti-counterfeit information layer is corresponding to at least a second region of the first regionalized polarization film, and the second region of the first regionalized polarization film has a polarization direction along the second polarization direction;
- the encrypted information is stored in a third region of the anti-counterfeit information layer, the third region of the anti-counterfeit information layer is corresponding to at least a third region of the first regionalized polarization film, and the third region of the first regionalized polarization film has a polarization direction along the third polarization direction,
- the second regionalized polarization film includes a first region having a same polarization direction as the first region or the third region of the first regionalized polarization film, and a second region having a polarization direction different from the second region of the first regionalized polarization film, such that when the second polarization film is disposed to cover the first regionalized polarization film, the scrambling information is blocked and the unique encrypted information is displayed to distinguish the brand product from the counterfeit products, when the second polarization film is not disposed to cover the first regionalized polarization film, both the scrambling information and the unique encrypted information is displayed; and
- an adhesive coefficient of the second adhesive layer is less than an adhesive coefficient of the first adhesive layer.

* * * * *